United States Patent
Yu (10) Patent No.: US 10,067,686 B2
(45) Date of Patent: Sep. 4, 2018

(54) APPARATUS AND METHOD FOR ENFORCING TIMING REQUIREMENTS FOR A MEMORY DEVICE

(71) Applicant: INTEL CORPORATION, Santa Clara, CA (US)

(72) Inventor: Jason K. Yu, Burnaby (CA)

(73) Assignee: INTEL CORPORATION, Santa Clara, CA (US)

( * ) Notice: Subject to any disclaimer, the term of this patent is extended or adjusted under 35 U.S.C. 154(b) by 153 days.

(21) Appl. No.: 14/972,060

(22) Filed: Dec. 16, 2015

(65) Prior Publication Data
US 2017/0177240 A1 Jun. 22, 2017

(51) Int. Cl.
*G06F 12/08* (2016.01)
*G06F 3/06* (2006.01)
*G06F 12/0877* (2016.01)

(52) U.S. Cl.
CPC .......... *G06F 3/0611* (2013.01); *G06F 3/0653* (2013.01); *G06F 3/0688* (2013.01); *G06F 12/0877* (2013.01); *G06F 2212/1024* (2013.01); *G06F 2212/60* (2013.01)

(58) Field of Classification Search
CPC ......... G06F 12/0877; G06F 2212/1024; G06F 2212/60; G06F 3/0611; G06F 3/0653; G06F 3/0688
See application file for complete search history.

(56) References Cited

U.S. PATENT DOCUMENTS 8,612,676 B2   12/2013  Dahlen et al.
2014/0033019 A1*  1/2014  Zhang ............... G06F 17/30902
                                                    715/234

OTHER PUBLICATIONS

Cinwell, "DDRx Timing Constraints [incomplete]", [online], Jun. 27, 2013, [retrieved on Nov. 22, 2025], Retrieved from the Internet at <URL: https://cinwell.wordpress.com/2013/06/27/ddrx-timing-constraints-incom. . . >, 3 pp.
Wikipedia, "Memory Timings", [online], last modified Apr. 7, 2015, [Retrieved on Nov. 22, 2105], Retrieved from the Internet at <URL: https://en.wikipedia.org/wiki/Memory_timings>, 2 pp.

* cited by examiner

*Primary Examiner* — Yong Choe
(74) *Attorney, Agent, or Firm* — Konrad Raynes Davda & Victor LLP; David W. Victor (57) ABSTRACT

Provided are an apparatus and method for enforcing timing requirements for a memory device. An event command directed to a target addressable location comprising one of the addressable locations is received. A determination is made as to whether a time difference of a current time and a timestamp associated with a completed event directed to a threshold location including the target addressable location exceeds a time threshold. The received event command is executed against the target addressable location in response to determining that the time difference exceeds the time threshold.

25 Claims, 4 Drawing Sheets

Time Threshold Instance

FIG. 3

Event Command

FIG. 4

Completed Event Information

APPARATUS AND METHOD FOR ENFORCING TIMING REQUIREMENTS FOR A MEMORY DEVICE

TECHNICAL FIELD

Embodiments described herein generally relate to an apparatus and method for enforcing timing requirements for a memory device.

BACKGROUND

In Dynamic Random Access Memory (DRAM) systems, there are constraints on how frequently consecutive read and write commands and other data movement operations may be performed. DRAM devices implement a lockout feature to ensure that commands are not issued that violate the timing requirements for different types of operations. For instance, the DRAM may be locked out, i.e., unavailable, for read and write operations for a required time to refresh the DRAM.

There is a need in the art for providing improved techniques for enforcing timing requirements for memory devices.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Described embodiments provide techniques to enforce timing requirements that require an elapsed duration to occur before performing different types of events, such as read and write operations, with respect to a same addressable memory location. Described embodiments provide techniques to enforce timing requirements indicating required elapsed time duration between performing different types of commands for a three dimensional stacked cross point memory in which the target addressable locations may be identified by a die and one of a plurality of partitions in a die.

With described embodiments, upon receiving an event directed to a target addressable location, a determination is made as to whether a time difference of a current time and a timestamp associated with a completed event directed to a threshold location including the target addressable location exceeds a time threshold. The received event command is executed against the target addressable location in response to determining that the time difference exceeds the time threshold. Further, with described embodiments, there may be a list indicating completed events, where entries for completed events remain on the list, such as a First-In-First-Out (FIFO) buffer, for a predetermined time period before being removed from the list. Each of the completed event entries may indicate a timestamp and a threshold location, such as a partition, including the address to which the completed event was directed. This information is used to determine whether a determined threshold time has elapsed since the indicated completed event was processed at a same threshold location to determine whether to allow a new received event directed to the same threshold location to proceed.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
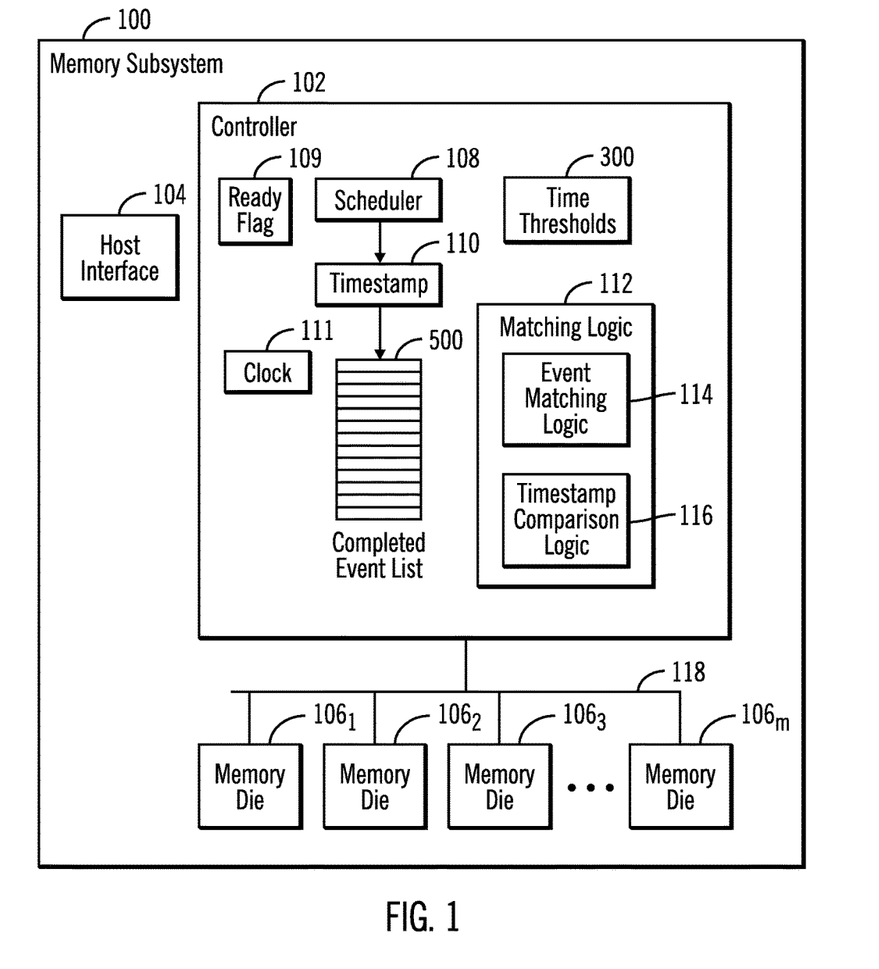
FIG. 1 illustrates an embodiment of a memory subsystem.

FIG. 1 illustrates an embodiment of a memory subsystem 100 including a memory controller 102, a host interface 104 to interface with a host system, and a plurality of memory dies $106_1, 106_2 \ldots 106_m$ comprise the storage elements that store data at addressable locations. In one embodiment, each die $106_i$ may comprise a plurality of addressable partitions, each having memory addresses. The controller 102 includes a scheduler 108 that queues event commands, such as read and write requests, received through the host interface 104 and dispatches the event commands to process and add to a completed event list 500 upon being executed. The scheduler 108 periodically checks a ready flag 109 and issues event commands to process if the ready flag 109 indicates a ready state. If the ready flag 109 does not indicate the ready state, then the scheduler 108 delays issuing event commands until during one of the periodic checks the ready flag 109 has returned to the ready state. A timestamp 110 is used to provide a timestamp to a completed event being added to the completed event list 500. Timing signals and clock cycles are generated by a clock 111. The timestamp 110 may increment every clock 111 cycle.

In further embodiments, there may be several different ready flags, supplied by several different "lockout units" that evaluate different conditions. Only when all the flags are ready, including the flag 109, can the scheduler 108 issue further event commands.

The controller 102 maintains time thresholds 300 for different pairs of event types, e.g., different pairs of read and write types, indicating a time that must elapse between a last completed event command directed to a target addressable location, e.g., die and partition, and a new received event command to the same target addressable location before the new received command can be processed. This enforces timing restrictions in the memory die $106_1, 106_2 \ldots 106_m$ partitions.

The controller 102 includes matching logic 112 comprising event matching logic 114 and timestamp comparison logic 116. The event matching logic 114 determines whether there is a completed event in the completed event list 500 that is directed to the same target addressable location as a received event command. The timestamp comparison logic determines whether the matching completed event in the event list 500 has a timestamp indicating that the matching completed event $500_i$ has been in the list 500 for a time threshold, i.e., that a specified time has elapsed since the last event command directed to the target addressable location was processed.

The memory controller 112 interfaces with the memory dies $106_1$, $106_2$ ... $106_m$ over a memory interface 118.

The memory subsystem 100 and memory dies $106_1$, $106_2$ ... $106_m$ may implement a non-volatile memory device which requires timing requirements of elapsed time that must occur before a subsequent command is processed against a same addressable location, to space out commands in time to a same location. In one embodiment the memory subsystem 100 may implement a three dimensional multi-layer stacked crosspoint memory array. The memory subsystem 100 may implement other non-volatile memory types, such as NAND memory cells, ferroelectric random-access memory (FeTRAM), nanowire-based non-volatile memory, phase change memory (PCM), memory that incorporates memristor technology, Magnetoresistive random-access memory (MRAM), Spin Transfer Torque (STT)-MRAM, Resistive Random Access Memory (ReRAM), etc.

Figure 2:
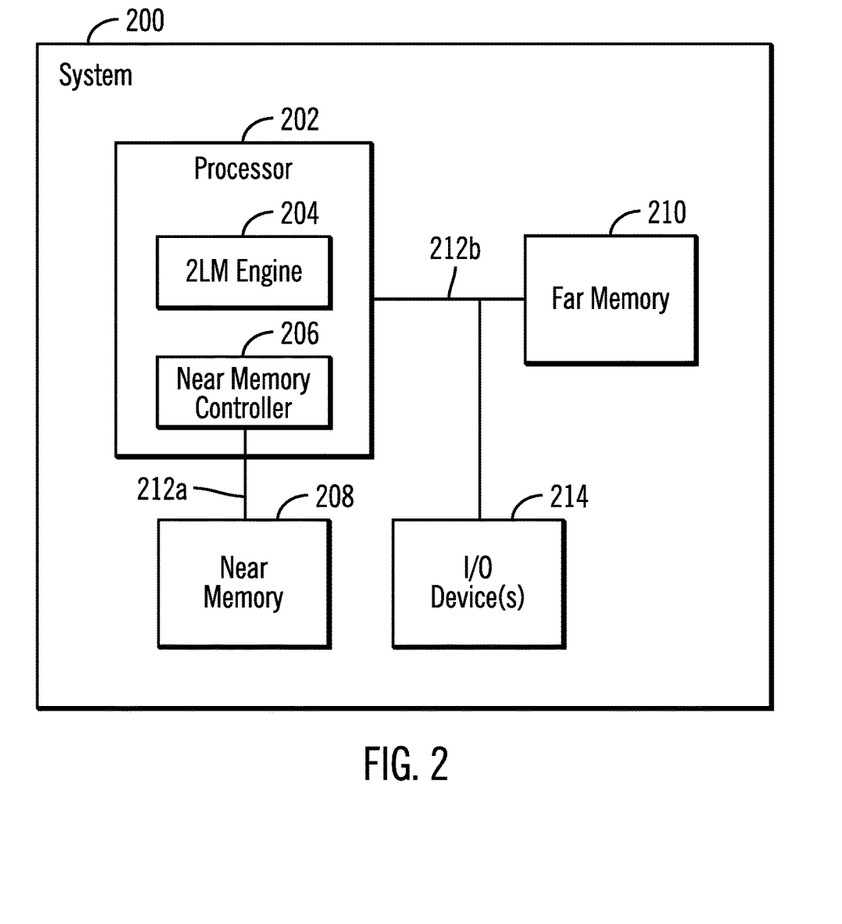
FIG. 2 illustrates an embodiment of a system including a near memory and far memory.

FIG. 2 illustrates an embodiment of a system 200 having a processor 202 including a two level memory (2LM) engine 204 that supports a two level main memory comprised of a first level ("near") memory 208 and a second level ("far") memory 210. The processor 202 may include a near memory controller 206 to interface with the near memory 208. The far memory 210 may comprise the memory subsystem 100 described with respect to FIG. 1. In one embodiment, the far memory 210 provides more data storage than the near memory 208 and the near memory 208 provides a faster access cache for the far memory 210. In one embodiment, the near memory 208 may comprise a Dynamic Random Access Memory (DRAM) that caches data in the far memory 210. The 2LM engine 204 determines whether data requested by the processor 202 from the main memory is in the near memory 208, and if not, the 2LM engine 204 fetches the requested data from the far memory 210. The processor 202 communicates with the near memory 208 and the far memory 210 over bus interfaces 212a and 212b, respectively, such as a processor bus, fabric, ring or mesh architecture internal to the processor 202, e.g., central processing unit (CPU), Intel Corporation's KEIZER TECHNOLOGY INTERCONNECT® (KTI), an Open Core Protocol interconnect, other types of standardized or proprietary interconnects. (Keizer Technology Interconnect is a registered trademark of Intel Corporation throughout the world).

In an alternative embodiment, the far memory 210 may comprise a solid state drive (SSD) and the bus interface 212b may comprise a Peripheral Component Interconnect express (PCIe) bus.

The system 200 may also communicate with Input/Output (I/O) devices 214, which may comprise input devices (e.g., keyboard, touchscreen, mouse, etc.), display devices, graphics cards, ports, network interfaces, etc.

Figure 3:
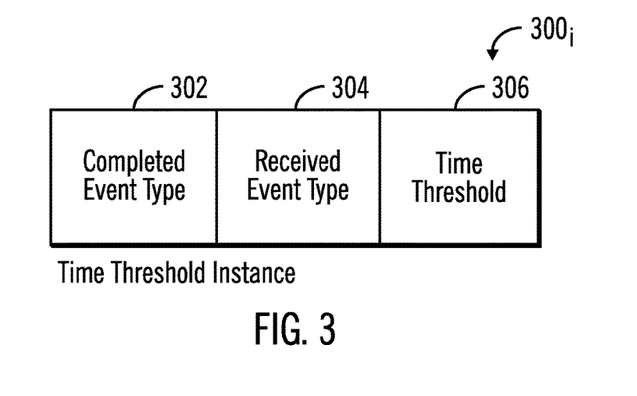
FIG. 3 illustrates an embodiment of a time threshold instance.

FIG. 3 illustrates an embodiment of a time threshold instance $300_i$ providing a time threshold 306 for a pair of event types, specifying a completed event type 302 and received event type 304. This information indicates the elapsed time, or time threshold 306, that must pass from a timestamp for the completed event type 302 before the received event type 304 is allowed to proceed against the same threshold location in the memory dies $106_1$, $106_2$ ... $106_m$, such as a same partition. In this way the time thresholds 300 enforce timing restrictions for partitions to require a time to elapse before different types of event types, such as different types of read and write operations, are allowed to proceed since a last executed event at the threshold location, such as a die and partition.

In one embodiment, if there are four different event types, then there are sixteen different time thresholds $300_i$. For read or write command types that take longer to process than other event types, the time threshold 306 may be longer to provide more time for the command to complete, so that the time threshold is commensurate with an expected execution time of the command type. In an alternative embodiment, there may just be one time threshold for all event types. Still further, there may be different numbers of time thresholds for different numbers of event types.

Figure 4:
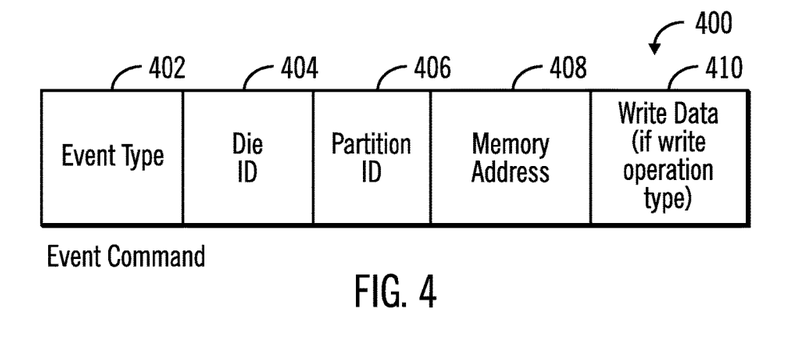
FIG. 4 illustrates an embodiment of an event command.

FIG. 4 illustrates an embodiment of an event command, such as a read or write command, and includes an event command type 402 identifying the type of the event command, a die identifier (ID) 404, partition identifier (ID) 406, and memory address 408, and write data 410 if the event type is a type of write command. A partition comprises a physical collection of memory addresses. The combination of the die 404, partition 406, and memory address 408 comprise the target addressable location of the command 402. For other addressing schemes, the addressable location may comprise a different format.

Figure 5:
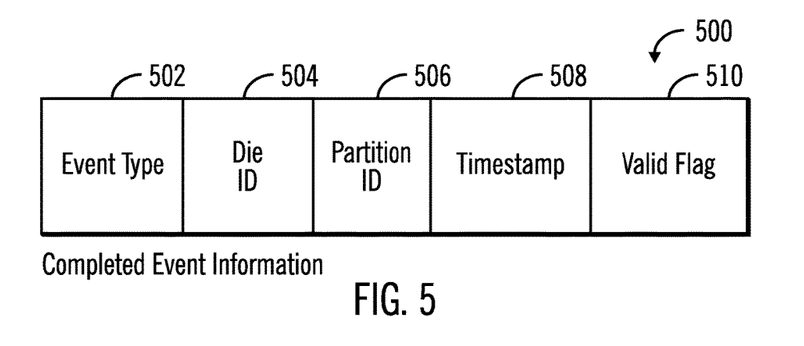
FIG. 5 illustrates an embodiment of completed event information.

FIG. 5 illustrates an embodiment of completed event information $500_i$ maintained in the completed event list 500 for a completed event, and includes an event type 502 indicating the type of event, e.g., type of read or write command; a threshold location at which the command was performed, which may be indicated by die ID 504 and partition ID 506; a timestamp 508 associated with the completed event, such as a timestamp assigned by the timestamp component 110 indicating when the completed event $500_i$ was added to the completed event list 500; and a valid flag 510 indicating whether the event is valid and ready to be considered as a match for an incoming event. If the valid flag 510 indicates the event $500_i$ is invalid then it is not eligible to be selected as a match to an incoming event command 400 being processed.

In one embodiment, an event command 400 is directed to a target addressable location identified by die ID 404, partition ID 406, and memory address 408. However, in one embodiment, the completed event information $500_i$ may only provide information on a threshold location to which the event was directed, which may comprise the die ID 504 and partition ID 506, because the threshold timers may apply to a partition (or threshold location), not individual addresses. Thus, the determination relevant for determining whether the threshold is satisfied is whether a threshold time has passed between event commands directed to the same or different memory addresses within a same partition, or same threshold location. In an alternative embodiment where thresholds apply to specific memory addresses, than the threshold location may also include the memory address of the completed event.

In certain embodiments, the completed event list 500 may comprise a First-in-First-Out (FIFO) buffer, such that new completed events from the scheduler 108 are added to a head of the buffer list and the oldest completed events having the oldest timestamp 508 are removed from a tail end of the list 500. Completed events $500_i$ may remain on the list 500 for a period of time, such as a fixed number of clock 111 cycles before being dequeued from a tail end of the list 500.

In one embodiment, the event list 500 may comprise a chain of shift registers, where each shift register comprises a bit array capable of storing the completed event information $500_i$. After a fixed number of clock 111 cycles, the completed events shift one register down the chain. A completed event $500_i$ shifted out of the shift register, i.e., the last shift register, is thus removed and no longer maintained for comparison with a new received event command 400. In one embodiment, the shift register may shift every fixed number of clock 111 cycles that corresponds to the number of clock 111 cycles at which the scheduler 108 issues new commands, so that as the scheduler 108 is issuing a new command after a fixed number of clock 111 cycles, the completed events shift through the register as the new event from the scheduler 108 is shifted-in to the event list 500 at the first register. If the scheduler 108 is instructed to stop issuing completed events, the shift register may continue to shift completed event entries $500_i$ through the shift registers every fixed number of clock 111 cycles.

Figure 6:
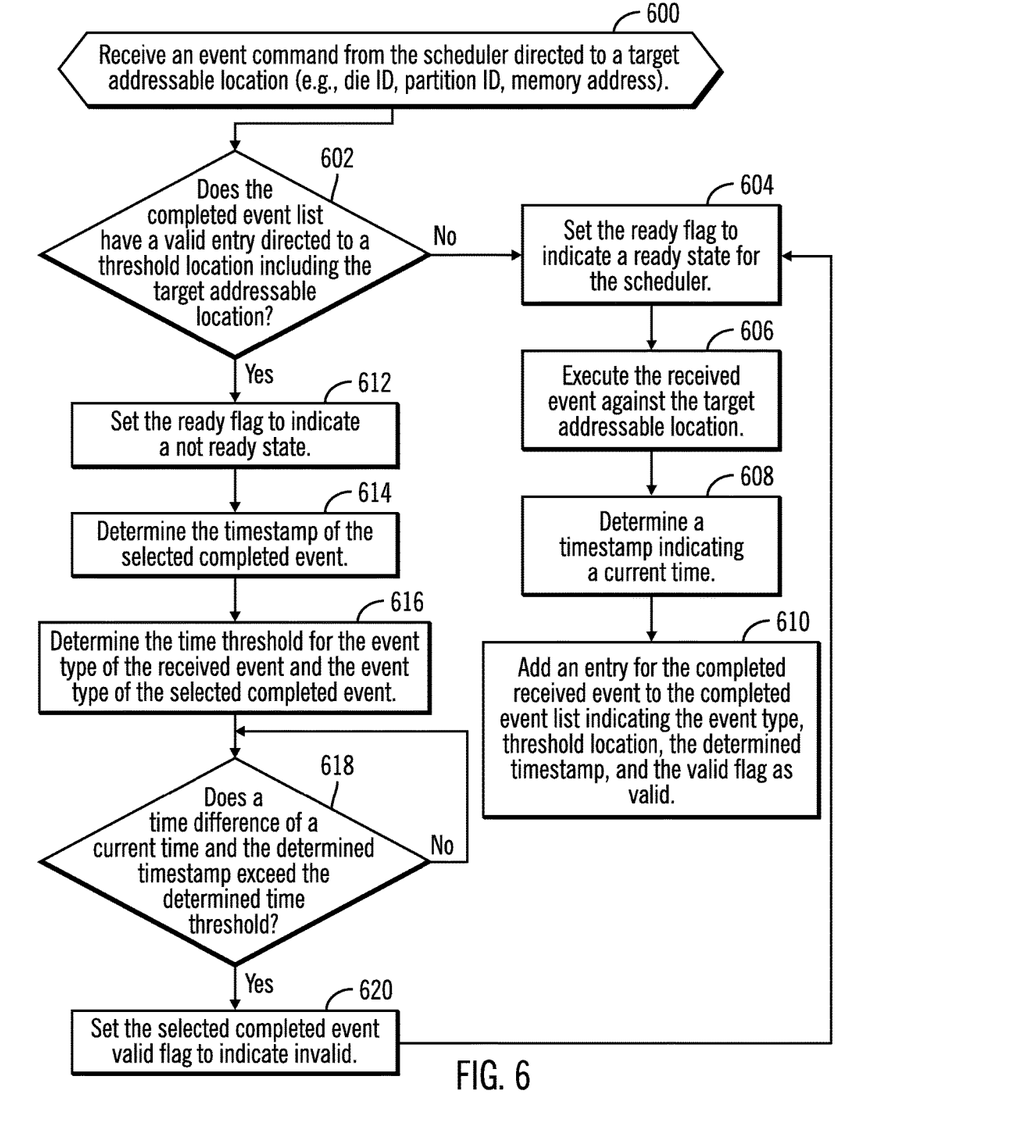
FIG. 6 illustrates an embodiment of operations performed to process a received event command and enforce timing requirements.

FIG. 6 illustrates an embodiment of operations performed by the controller 102 to process an event command 400 from the scheduler 108 directed to a target addressable location, e.g., a die ID 404, partition ID 406, and memory address 408. The scheduler 108 periodically sends event commands 400 while the ready flag 109 indicates a ready state, and does not send event commands 400 to the matching logic 112 to process if the ready flag 109 does not indicate the ready state. The event matching logic 114 determines (at block 602) whether the completed event list 500 has a valid entry $500_i$, as indicated by the valid flag 510, directed to the same threshold location, e.g., the die ID 504 and partition 506, matching those corresponding fields 404 and 406, respectively, in the received event command 400 (i.e., the completed event $500_i$ has a threshold location (e.g., 504, 506) including the target addressable location (e.g., 404, 406, 408)). In certain embodiments, to increase matching speed, the matching logic 114 matches the incoming event commands 400 against all entries in the completed event list 500, by die ID and partition ID, in parallel.

If (at block 602) there is no match, then the matching logic 112 sets (at block 604) the ready flag 109 to indicate the ready state to signal the scheduler 108 to send a new event command 400 when the scheduler 108 periodically checks the ready flag 109. The received event command 400, e.g., read or write command, is executed (at block 606) against the target addressable location. A timestamp indicating a current time is determined (at block 608) from the timestamp component 110 and completed event information $500_1$ is added (at block 610) to a head of the completed event list 500 indicating the event type 502, such as from the event type 402 in the command 400; the threshold location, e.g., die ID 504 and partition ID 506 as included in fields 404 and 406, respectively, of the event command 400; the determined timestamp 508; and setting the valid flag 510 to valid.

If (at block 602) the completed event list 500 does have a valid entry $500_i$ with a threshold location including the target addressable location (i.e., having a die ID 504 and partition 506 matching those of the event command 404 and 406), then the ready flag 109 is set (at block 612) to indicate the not ready state so that the scheduler 108 will not send further event commands 400 while the matching logic 112 is in the process of determining whether to allow the received event command 500 to proceed.

The timestamp comparison logic 116 determines (at block 614) the timestamp 508 of the selected completed event $500_i$. The time threshold $300_i$ is determined (at block 616) having as the completed event type 302 the event type 502 of the selected completed event and having as the received event type 304 the event type 402 of the received event command 400. The timestamp comparison logic 116 determines (at block 618) whether a time difference of a current time and the determined timestamp 508 exceeds the determined time threshold $300_i$. If so, then the required time has elapsed since the selected completed event directed to the threshold location was processed and the valid flag 510 for the selected completed event $500_i$ is set (at block 620) to indicate invalid so that selected completed event will not be considered in future matching operations. Control then processed to block 604 to process the received event command 400.

If (at block 618) the time difference is less than the determined time threshold $300_i$, then the timing requirement for the threshold location has not been satisfied and the timestamp comparison logic 116 proceeds back to block 618 to determine on the next clock 111 cycle whether the time threshold has been exceeded.

With the described embodiments, the a determination of whether a timing requirement with respect to a threshold location has been satisfied is made by determining whether a time difference of a current time and a timestamp associated with a completed event directed to the threshold location including the target addressable location exceeds a time threshold. A list may be maintained of completed events to determine if a new received event is directed toward a same threshold location, e.g., partition, as one of the completed events in the list and, if so, whether a required time threshold has elapsed since the completed event directed to the same target addressable location completed.

Although the described embodiments concern locking out a scheduler issuing event commands, the described technique for determining when to process commands may be applied to any other type of operation that seeks to access one of multiple resources, where the time thresholds can be used to determine the time different operations must wait before access is granted to a shared computing resource.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The reference characters used herein, such as i and m, are used herein to denote a variable number of instances of an element, which may represent the same or different values, and may represent the same or different value when used with different or the same elements in different described instances.

EXAMPLES

Example 1 is an apparatus for processing event commands with respect to data in addressable locations, comprising: memory dies to store data in addressable locations; a controller to perform read and write operation with respect to the memory dies, to: receive an event command directed to a target addressable location comprising one of the addressable locations; determine whether a time difference of a current time and a timestamp associated with a completed event directed to a threshold location including the target addressable location exceeds a time threshold; and execute the received event command against the target addressable location in response to determining that the time difference exceeds the time threshold.

In Example 2, the subject matter of Examples 1 and 3-11 can optionally include that there are a plurality of time thresholds for combinations of different types of events comprising different types of read and write commands, wherein determining whether the time difference exceeds the time threshold comprises: determine a type of the received read or write command; determine a type of the completed read or write command directed to the target addressable location; determine one of the time thresholds for the determined type of the received read or write command and the determined type of the completed read or write command, wherein the time threshold comprises the determined time threshold.

In Example 3, the subject matter of Examples 1, 2, and 4-11 can optionally include that the controller is further to: set a ready flag to indicate a not ready state in response to determining the completed event directed to the target address location, wherein a scheduler does not issue new events to process while the ready flag indicates the not ready state; set the ready flag to indicate a ready state in response to determining that the time difference exceeds the time threshold, wherein the scheduler issues new events in response to the ready flag indicating the ready state.

In Example 4, the subject matter of Examples 1-3 and 5-11 can optionally include that the controller is further to: maintain a list indicating completed events; and select one of the completed events indicated in the list that is directed to the threshold location, wherein the determining whether the time difference exceeds the time threshold passed is performed with respect to the selected completed event indicated in the list.

In Example 5, the subject matter of Examples 1-4 and 6-11 can optionally include that the controller is further to: execute the received event against the target addressable location in response to determining that the list does not indicate one completed event directed to the threshold location.

In Example 6, the subject matter of Examples 1-5 and 7-11 can optionally include that the controller is further to: add the executed received event to the list indicating a current timestamp when the executed received event is added to the list; and remove one of the completed events in the list after a time period since the completed event was added to the list.

In Example 7, the subject matter of Examples 1-6 and 8-11 can optionally include that the list comprises a shift register, wherein the executed received event is shifted-in to the shift register and wherein the completed event that has been in the shift register a longest time is shifted out of the shift register, wherein the completed events shift through the shift register.

In Example 8, the subject matter of Examples 1-7 and 9-11 can optionally include that the shift register advances every fixed number of clock cycles comprising a number of clock cycles at which a new event is received to execute.

In Example 9, the subject matter of Examples 1-8, 10, and 11 can optionally include that the list includes for each indicated event an event type indicating one of a plurality of types of read and write commands, a time the read or write command was added to the list, and a threshold location to which the read or write command is directed.

In Example 10, the subject matter of Examples 1-9 and 11 can optionally include that the memory dies provide non-volatile memory, wherein the memory dies each have a plurality of partitions, wherein the target addressable location indicates a memory die, the partition, and memory address in the partition to which the read or write command is directed, and wherein the location indicated in the entries in the completed event list indicates the memory die and the partition to which the completed event was directed.

In Example 11, the subject matter of Examples 1-10 can optionally include that the memory comprises a three dimensional cross point architecture, wherein the memory has a timing requirement that a received event directed to one of the partitions needs to wait the time threshold since a previous event was performed at the partition.

Example 12 is a system for processing event commands with respect to data in addressable locations, comprising: a processor; a main memory for the processor including a near memory and a far memory, wherein the near memory caches data for the far memory; wherein the far memory comprises memory dies for storing data in addressable locations; a controller that performs read and write operation with respect to the memory dies, to: receive an event command directed to a target addressable location comprising one of the addressable locations; determine whether a time difference of a current time and a timestamp associated with a completed event directed to a threshold location including the target addressable location exceeds a time threshold; and execute the received event command against the target addressable location in response to determining that the time difference exceeds the time threshold.

In Example 13, the subject matter of Examples 12 and 14-18 can optionally include that there are a plurality of time thresholds for combinations of different types of events comprising different types of read and write commands, wherein determining whether the time difference exceeds the time threshold comprises: determine a type of the received read or write command; determine a type of the completed read or write command directed to the target addressable location; determine one of the time thresholds for the determined type of the received read or write command and the determined type of the completed read or write command, wherein the time threshold comprises the determined time threshold.

In Example 14, the subject matter of Examples 12, 13, and 15-18 can optionally include that the controller is further to: set a ready flag to indicate a not ready state in response to determining the completed event directed to the target address location, wherein a scheduler does not issue new events to process while the ready flag indicates the not ready state; set the ready flag to indicate a ready state in response to determining that the time difference exceeds the time threshold, wherein the scheduler issues new events in response to the ready flag indicating the ready state.

In Example 15, the subject matter of Examples 12-14 and 16-18 can optionally include that the controller is further to: maintain a list indicating completed events; and select one of the completed events indicated in the list that is directed to the threshold location, wherein the determining whether the time difference exceeds the time threshold passed is performed with respect to the selected completed event indicated in the list.

In Example 16, the subject matter of Examples 12-15, 17, and 18 can optionally include that the controller is further to: add the executed received event to the list indicating a current timestamp when the executed received event is added to the list; and remove one of the completed events in the list after a time period since the completed event was added to the list.

In Example 17, the subject matter of Examples 12-16 and 18 can optionally include that the list comprises a shift register, wherein the executed received event is shifted-in to the shift register and wherein the completed event that has been in the shift register a longest time is shifted out of the shift register, wherein the completed events shift through the shift register.

In Example 18, the subject matter of Examples 12-17 can optionally include that the list includes for each indicated event an event type indicating one of a plurality of types of read and write commands, a time the read or write command was added to the list, and a threshold location to which the read or write command is directed.

Example 19 is a method for processing event commands with respect to data in addressable locations in memory dies, comprising: receiving an event command directed to a target addressable location comprising one of the addressable locations; determining whether a time difference of a current time and a timestamp associated with a completed event directed to a threshold location including the target addressable location exceeds a time threshold; and executing the received event command against the target addressable location in response to determining that the time difference exceeds the time threshold.

In Example 20, the subject matter of Example 19 can optionally include at least one of:

(1) that there are a plurality of time thresholds for combinations of different types of events comprising different types of read and write commands, wherein determining whether the time difference exceeds the time threshold comprises: determining a type of the received read or write command; determining a type of the completed read or write command directed to the target addressable location; determining one of the time thresholds for the determined type of the received read or write command and the determined type of the completed read or write command, wherein the time threshold comprises the determined time threshold; and/or (2) setting a ready flag to indicate a not ready state in response to determining the completed event directed to the target address location, wherein a scheduler does not issue new events to process while the ready flag indicates the not ready state; setting the ready flag to indicate a ready state in response to determining that the time difference exceeds the time threshold, wherein the scheduler issues new events in response to the ready flag indicating the ready state; and/or (3) maintaining a list indicating completed events; and selecting one of the completed events indicated in the list that is directed to the threshold location, wherein the determining whether the time difference exceeds the time threshold passed is performed with respect to the selected completed event indicated in the list; and/or (4) executing the received event against the target addressable location in response to determining that the list does not indicate one completed event directed to the threshold location; and/or (5) adding the executed received event to the list indicating a current timestamp when the executed received event is added to the list; and removing one of the completed events in the list after a time period since the completed event was added to the list; and/or (6) that the list comprises a shift register, wherein the executed received event is shifted-in to the shift register and wherein the completed event that has been in the shift register a longest time is shifted out of the shift register, wherein the completed events shift through the shift register; and/or (7) that the shift register advances every fixed number of clock cycles comprising a number of clock cycles at which a new event is received to execute; and/or (8) that the list includes for each indicated event an event type indicating one of a plurality of types of read and write commands, a time the read or write command was added to the list, and a threshold location to which the read or write command is directed; and/or (9) that the memory dies provide non-volatile memory, wherein the memory dies each have a plurality of partitions, wherein the target addressable location indicates a memory die, the partition, and memory address in the partition to which the read or write command is directed, and wherein the location indicated in the entries in the completed event list indicates the memory die and the partition to which the completed event was directed; and/or (10) that the memory comprises a three dimensional cross point architecture, wherein the memory has a timing requirement that a received event directed to one of the partitions needs to wait the time threshold since a previous event was performed at the partition.

Example 21, is an apparatus, comprising: means for receiving an event command directed to a target addressable location comprising one of the addressable locations; means for determining whether a time difference of a current time and a timestamp associated with a completed event directed to a threshold location including the target addressable location exceeds a time threshold; and means for executing the received event command against the target addressable location in response to determining that the time difference exceeds the time threshold.

In Example 22, the subject matter of Example 21 can optionally include that there are a plurality of time thresholds for combinations of different types of events comprising different types of read and write commands, wherein the means for determining whether the time difference exceeds the time threshold comprises: means for determining a type of the received read or write command; means for determining a type of the completed read or write command directed to the target addressable location; means for determining one of the time thresholds for the determined type of the received read or write command and the determined type of the completed read or write command, wherein the time threshold comprises the determined time threshold.

Example 23 is a machine-readable storage including machine-readable instructions, when executed, to implement a method or realize an apparatus or system as claimed in any preceding claim.

Example 24 is an apparatus comprising means to perform a method as claimed in any preceding claim.

What is claimed:
1. An apparatus, comprising:
   memory dies to store data in addressable locations;
   a controller to perform read and write operation with respect to the memory dies, to:
      receive an event command directed to a target addressable location comprising one of the addressable locations;
      determine whether a time difference of a current time and a timestamp associated with a completed event directed to a threshold location comprising multiple addressable locations of the addressable locations including the target addressable location exceeds a time threshold; and
      execute the received event command against the target addressable location in response to a determination that the time difference exceeds the time threshold.

2. The apparatus of claim 1, wherein there are a plurality of time thresholds for combinations of different types of events comprising different types of read and write commands, wherein to determine whether the time difference exceeds the time threshold comprises:
   determine a type of the received read or write command;
   determine a type of the completed read or write command directed to the target addressable location; and
   determine a time threshold of the time thresholds for the determined type of the received read or write command and the determined type of the completed read or write command, wherein the time threshold comprises the determined time threshold.

3. The apparatus of claim 1, wherein the controller is further to:
   set a ready flag to indicate a not ready state in response to a determination of the completed event directed to the target address location, wherein a scheduler does not issue new events to process while the ready flag indicates the not ready state; and
   set the ready flag to indicate a ready state in response to the determination that the time difference exceeds the time threshold, wherein the scheduler issues new events in response to the ready flag indicating the ready state.

4. The apparatus of claim 1, wherein the controller is further to:
   maintain a list indicating completed events; and
   select one of the completed events indicated in the list that is directed to the threshold location, wherein the determination of whether the time difference exceeds the time threshold passed is performed with respect to the selected completed event indicated in the list.

5. The apparatus of claim 4, wherein the controller is further to:
   execute the received event command against the target addressable location in response to a determination that the list does not indicate one completed event directed to the threshold location.

6. The apparatus of claim 4, wherein the controller is further to:
   add an executed received event to the list indicating a current timestamp when the executed received event is added to the list; and
   remove a completed event of the completed events in the list after a time period since the completed event was added to the list.

7. The apparatus of claim 6, wherein the list comprises a shift register, wherein the executed received event is shifted-in to the shift register and wherein the completed event that has been in the shift register a longest time is shifted out of the shift register, wherein completed events shift through the shift register.

8. The apparatus of claim 7, wherein the shift register advances every fixed number of clock cycles comprising a number of clock cycles at which a new event is received to execute.

9. The apparatus of claim 4, wherein the list includes for each indicated event an event type indicating one of a plurality of types of read and write commands, a time the read or write command was added to the list, and a threshold location to which the read or write command is directed.

10. The apparatus of claim 4, wherein the memory dies provide non-volatile memory, wherein the memory dies each have a plurality of partitions, wherein the target addressable location indicates a memory die, the partition, and memory address in the partition to which the read or write command is directed, and wherein a location indicated in the list indicates the memory die and the partition to which the completed event was directed.

11. The apparatus of claim 10, wherein the memory comprises a three dimensional cross point architecture, wherein the memory has a timing requirement that a received event directed to one of the partitions needs to wait the time threshold since a previous event was performed at the partition.

12. A system, comprising:
    a processor;
    a main memory for the processor including a near memory and a far memory, wherein the near memory caches data for the far memory;
    wherein the far memory comprises
       memory dies for storing data in addressable locations;
       a controller that performs read and write operation with respect to the memory dies, to:
          receive an event command directed to a target addressable location comprising one of the addressable locations;
          determine whether a time difference of a current time and a timestamp associated with a completed event directed to a threshold location comprising multiple addressable locations of the addressable locations including the target addressable location exceeds a time threshold; and
          execute the received event command against the target addressable location in response to a determination that the time difference exceeds the time threshold.

13. The system of claim 12, wherein there are a plurality of time thresholds for combinations of different types of events comprising different types of read and write commands, wherein to determine whether the time difference exceeds the time threshold comprises:
    determine a type of the received read or write command;
    determine a type of the completed read or write command directed to the target addressable location; and
    determine a time threshold of the time thresholds for the determined type of the received read or write command and the determined type of the completed read or write command, wherein the time threshold comprises the determined time threshold.

14. The system of claim 12, wherein the controller is further to:
    set a ready flag to indicate a not ready state in response to a determination of the completed event directed to the target address location, wherein a scheduler does not issue new events to process while the ready flag indicates the not ready state; and set the ready flag to indicate a ready state in response to determining that the time difference exceeds the time threshold, wherein the scheduler issues new events in response to the ready flag indicating the ready state.

15. The system of claim 12, wherein the controller is further to:

maintain a list indicating completed events; and select one of the completed events indicated in the list that is directed to the threshold location, wherein the determination of whether the time difference exceeds the time threshold passed is performed with respect to the selected completed event indicated in the list.

16. The system of claim 15, wherein the controller is further to:

add an executed received event to the list indicating a current timestamp when the executed received event is added to the list; and remove a completed event of the completed events in the list after a time period since the completed event was added to the list.

17. The system of claim 16, wherein the list comprises a shift register, wherein the executed received event is shifted-in to the shift register and wherein the completed event that has been in the shift register a longest time is shifted out of the shift register, wherein completed events shift through the shift register.

18. The system of claim 15, wherein the list includes for each indicated event an event type indicating one of a plurality of types of read and write commands, a time the read or write command was added to the list, and a threshold location to which the read or write command is directed.

19. A method for processing event commands with respect to data in addressable locations in memory dies, comprising:

receiving an event command directed to a target addressable location comprising one of the addressable locations;

determining whether a time difference of a current time and a timestamp associated with a completed event directed to a threshold location comprising multiple addressable locations of the addressable locations including the target addressable location exceeds a time threshold; and executing the received event command against the target addressable location in response to determining that the time difference exceeds the time threshold.

20. The method of claim 19, wherein there are a plurality of time thresholds for combinations of different types of events comprising different types of read and write commands, wherein whether the time difference exceeds the time threshold comprises:

determining a type of the received read or write command;

determining a type of the completed read or write command directed to the target addressable location; and determining a time threshold of the time thresholds for the determined type of the received read or write command and the determined type of the completed read or write command, wherein the time threshold comprises the determined time threshold.

21. The method of claim 19, further comprising:

setting a ready flag to indicate a not ready state in response to determining the completed event directed to the target address location, wherein a scheduler does not issue new events to process while the ready flag indicates the not ready state; and setting the ready flag to indicate a ready state in response to determining that the time difference exceeds the time threshold, wherein the scheduler issues new events in response to the ready flag indicating the ready state.

22. The method of claim 19, further comprising:

maintaining a list indicating completed events; and selecting one of the completed events indicated in the list that is directed to the threshold location, wherein the determining whether the time difference exceeds the time threshold passed is performed with respect to the selected completed event indicated in the list.

23. The method of claim 22, further comprising:

adding an executed received event to the list indicating a current timestamp when the executed received event is added to the list; and removing a completed event of the completed events in the list after a time period since the completed event was added to the list.

24. The method of claim 23, wherein the list comprises a shift register, wherein the executed received event is shifted-in to the shift register and wherein the completed event that has been in the shift register a longest time is shifted out of the shift register, wherein completed events shift through the shift register.

25. The method of claim 22, wherein the list includes for each indicated event an event type indicating one of a plurality of types of read and write commands, a time the read or write command was added to the list, and a threshold location to which the read or write command is directed.

* * * * *